United States Patent [19]

Hawkins et al.

[11] Patent Number: 5,089,598

[45] Date of Patent: Feb. 18, 1992

[54] ENDCAPPED, CHAIN-EXTENDED AND BRANCHED POLYESTERS

[75] Inventors: Christopher M. Hawkins, Schenectady, N.Y.; Edgar E. Bostick; James L. Derudder, both of Mt. Vernon, Ind.

[73] Assignee: General Electric Company, Mt. Vernon, Ind.

[21] Appl. No.: 594,599

[22] Filed: Oct. 5, 1990

[51] Int. Cl.⁵ .............................................. C08G 63/91
[52] U.S. Cl. ...................................... 528/272; 528/283; 528/399; 525/437; 525/446
[58] Field of Search ............... 528/272, 283, 395; 525/437, 446

[56] References Cited

U.S. PATENT DOCUMENTS

| 4,157,321 | 6/1979 | Kawakami et al. | |
| 4,311,760 | 1/1982 | Kalinowski et al. | 428/391 |
| 4,443,502 | 4/1984 | Gutek | 427/387 |
| 4,594,134 | 6/1986 | Hanada et al. | 522/99 |
| 4,624,870 | 11/1986 | Anthony | 427/387 |
| 4,645,691 | 2/1987 | Ona et al. | 427/180 |
| 4,687,811 | 8/1987 | Sasaki et al. | 525/100 |
| 4,772,515 | 9/1988 | Hara et al. | 428/447 |
| 4,831,070 | 5/1989 | McInally et al. | 524/267 |
| 4,981,896 | 1/1991 | Okada et al. | 524/413 |
| 5,026,758 | 6/1991 | Grigo et al. | 524/423 |

*Primary Examiner*—Maurice J. Welsh
*Assistant Examiner*—Sam A. Acquah
*Attorney, Agent, or Firm*—Martin B. Barancik; Joseph T. Eisele

[57] ABSTRACT

Silane esters are transesterified with hydroxyl-terminated polyester resins to obtain end-capped, extended or branched polyester molding compositions.

10 Claims, No Drawings

ENDCAPPED, CHAIN-EXTENDED AND BRANCHED POLYESTERS

BACKGROUND OF THE INVENTION

1. Field of The Invention

The invention relates to polyester resins and more particularly to polyester resins end-capped, extended or branched with silane esters.

2. Brief Description of the Prior Art

Polyester resins are a well-known class of synthetic polymeric resins, generally prepared by the reaction of a polyhydric alcohol with a polyacid; see for example U.S. Pat. No. 3,989,672. Although such polyester resins have been found to be thermoplastically moldable under a broad range of molding conditions, some polyester resin compositions are not suitable for use in all desired applications because they inherently lack certain desired physical properties such as a particular intrinsic viscosity, weight average molecular weight range and like properties. The present invention provides a means for controlling molecular weights and intrinsic viscosities, while minimizing affects on other desired properties of the basic polyester resin. Thus, by the means of the present invention polyester resin chains can be terminated, extended and/or branched to control molecular weights and intrinsic viscosities.

SUMMARY OF THE INVENTION

The invention comprises a polyester resin, end-capped with a monovalent moiety of the formula:

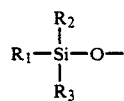

wherein $R_1$, $R_2$ and $R_3$ are each independently selected from the group consisting of hydrocarbyl, halogen-substituted hydrocarbyl and hydrocarbyloxy.

The term "hydrocarbyl" as used herein means the monovalent moiety obtained upon removal of a hydrogen atom from a parent hydrocarbon. Representative of hydrocarbyl are alkyl of 1 to 25 carbon atoms, inclusive, such as methyl, ethyl, propyl, butyl, pentyl, hexyl, heptyl, octyl, nonyl, undecyl, decyl, dodecyl, octadecyl, nonodecyl, eicosyl, heneicosyl, docosyl, tricosyl, tetracosyl, pentacosyl and the isomeric forms thereof; aryl of 6 to 25 carbon atoms, inclusive, such as phenyl, tolyl, xylyl, naphthyl, biphenyl, tetraphenyl and the like; aralkyl of 7 to 25 carbon atoms, inclusive, such as benzyl, phenethyl, phenpropyl, phenbutyl, phenhexyl, napthoctyl and the like; cycloalkyl of 3 to 8 carbon atoms, inclusive, such as cyclopropyl, cylobutyl, cyclopentyl, cyclohexyl, cycloheptyl, cyclooctyl and the like; alkenyl of 2 to 25 carbon atoms, inclusive, such as vinyl, allyl, butenyl, pentenyl, hexenyl, octenyl, nonenyl, decenyl, undececyl, dodecenyl, tridecenyl, pentadecenyl, octadecenyl, pentacosynyl and isomeric forms thereof.

The term "halogen-substituted hydrocarbyl" means hydrocarbyl as defined above, wherein one or more hydrogen atoms have been replaced with a halogen atom.

The term "halogen" is used herein in its conventionally accepted sense as embracive of chlorine, bromine and iodine.

The term "hydrocarbyloxy" means the monovalent moiety of formula:

—O—hydrocarbyl wherein "hydrocarbyl" is as defined above.

The polyester resins of the invention, end-capped with the monovalent moieties of the formula (I) given above have a wide variety of uses. For example, those resins wherein $R_1$, $R_2$ and $R_3$ are such that they lack a transesterification reactive group, i.e.; a group which will enter into a transesterification, are useful as thermoplastically moldable resins. These latter resin are relatively inert to further reactions having been deactivated in respect to functional groups.

The resins of the invention wherein at least one of $R_1$, $R_2$ and $R_3$ include a transesterification reactive group (such as, for example, a hydroxyl or an alkoxy group) are useful as polyester resin chain-extenders.

The resins of the invention wherein at least 2 of $R_1$, $R_2$ and $R_3$ are groups containing transesterification reactive functional groups are useful branching agents for the preparation of branched polyester resins.

These and other uses for the resins of the invention will be described in more detail below.

The invention also comprises the chain extended and branched polyester resins prepared using the above-described intermediate resins.

DETAILED DESCRIPTION OF THE PREFERRED EMBODIMENTS OF THE INVENTION

The end-capped polyester resins of the invention may be prepared by transesterifying a silane ester of the formula II given below, with a hydroxyl-terminated polyester.

wherein, $R_1$, $R_2$ and $R_3$ are as defined above and R represents hydrocarbyl.

The hydroxyl-terminated polyesters are polymers or copolymers prepared by condensing a dicarboxylic acid (or an ester forming compound thereof) with a stoichiometric molar excess of a glycol (or an ester forming compound thereof).

Representative of the dicarboxylic acids for preparing polyesters are the aromatic dicarboxylic acids such as terephthalic acid, isophthalic acid, orthophthalic acid, 2,6-naphthalene dicarboxylic acid, 1,5-naphthalene dicarboxylic acid, bis(p-carboxyphenyl)methane, 1,2-bis(p-carboxyphenoxy) ethane, anthracene dicarboxylic acid, 4,4'-diphenyl dicarboxylic acid, 4,4-diphenylether dicarboxylic acid; aliphatic dicarboxylic acids such as adipic acid, sebacic acid, azelaic acid; cycloaliphatic dicarboxylic acids such as 1,3-cyclohexane dicarboxylic acid, 1,4-cyclohexane dicarboxylic acid and the like, or ester-forming compounds thereof.

Rather than utilizing the difunctional carboxylic acid per se, it is possible, sometimes even preferred, to employ the reactive derivatives of said acid. Illustrative of these reactive derivatives are the acid halides. The preferred acid halides are the acid dichlorides and the acid dibromides. Thus, for example, instead of using isophthalic acid, terephthalic acid or mixtures thereof, it is possible to employ isophthaloyl dichloride, terephthaloyl dichloride, and mixtures thereof.

The glycols for preparing polyesters include aliphatic diols having 2 to 10 carbon atoms such as ethylene glycol, 1,3-propylene glycol, 1,4-butanediol, neopentyl glycol, 1,5-pentanediol, 1,6-hexanediol, decamethylene glycol, cyclohexanediol, long chain glycols having weight average molecular weights on the order of about 400-6,000 such as poly(ethylene glycol), poly(1,3-propylene glycol), poly(tetramethylene) glycol and the like. Mixtures of these glycols can also be employed.

Preferred polyesters are hydroxyl-terminated poly(ethylene terephthalate), poly(propylene terephthalate), poly(butylene terephthalate), poly(butylene sebacate), poly(ethylene 2,6-naphthalate), and copolyesters such as poly(ethylene isophthalate-terephthalate) (PETI), poly(butylene terephthalate-isophthalate) (PBTI) and the like. Among these, poly(ethylene terephthalate) and poly(butylene terephthalate) are preferably used because of their excellent mechanical properties.

Furthermore, mixtures of the above polyesters and copolyesters may also be employed as desired, and even a mixture with other organic polymers.

The silane esters of the formula (II) set forth above are well known compounds as are methods of their preparation. For example, they may be prepared by any of the methods described in the U.S. Pat. Nos. 2,967,171; 2,995,590; 3,215,719; 3,846,463; 3,912,774; 4,060,538; and 4,717,773, which are incorporated herein by reference.

Those compounds of the formula (II) wherein $R_1$, $R_2$ and $R_3$ each independently represent hydrocarbyl, or halogen-substituted hydrocarbyl, i.e.; monovalent groups which are inert under transesterification reaction conditions described herein, are represented by phenoxytrimethylsilane, ethoxytripropylsilane, phenoxytriphenylsilane and the like.

Those compounds of the formula (II) given above wherein one of $R_1$, $R_2$ and $R_3$ is a hydrocarbyloxy group are represented by dimethyldiethoxysilane, dimethyldiphenoxysilane, dimethyldiphenoxysilane and the like.

Those compounds of the formula (II) given above wherein two of $R_1$, $R_2$ and $R_3$ are hydrocarbyloxy groups are represented by methyltrimethoxysilane, methyltriphenoxysilane, phenyl triphenoxysilane, vinyltriphenoxysilane, cyanotriphenoxysilane and the like.

Those compounds of the formula (II) given above wherein each of $R_1$, $R_2$ and $R_3$ represent hydrocarbyloxy are represented by tetraphenoxysilane, tetra(2-ethylbutoxy)silane, tetrakis(2-methoxyethoxy) silane, tetracyclohexoxysilane, bis(geranioxy) diethoxysilane and the like.

Transesterification between the hydroxyl-terminated polyester and the silane compound of formula (II) given above may be carried out by melt-blending the two reactants. In general, the transesterification is advantageously carried out in a melt extruder. The transesterification is generally complete in a matter of minutes at melt temperatures (generally at a temperature within the range of from about 150° C. to about 350° C.).

The proportion of compound (II) added to the reaction mixture is generally within the range of from 0.1 to 3.0 mole percent of the polyester reactant.

Those skilled in the art will appreciate from the description given above, that embodiment polyester resins of the present invention may be represented by the schematic formula:

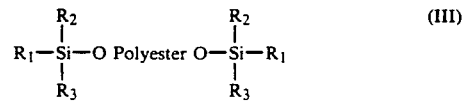

wherein $R_1$, $R_2$ and $R_3$ have the meanings previously ascribed to them.

Where one of $R_1$, $R_2$ and $R_3$ are a group amenable to transesterification reaction with another polyester chain, the endcapped polyester of the formula (III) shown above is an intermediate polymer for chain extending another hydroxyl-terminated polyester, resulting in a extended polyester of the formula:

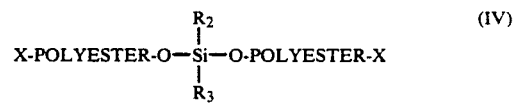

wherein $R_2$ and $R_3$ have the meanings previously ascribed to them and X is a monovalent moiety selected from the group consisting of a hydroxyl group, the silane moiety of formula (I) given above or through the moiety (I) given above a further polyester extension or branches of polyester segments.

Where at least 2 of $R_1$, $R_2$ and $R_3$ are groups amenable to transesterification reaction with another polyester chain, the endcapped polyester of the formula (III) shown above is an intermediate polymer for preparing a branched polyester by reactions with an additional hydroxyl-terminated polyester chain, resulting in a branched polyester of general formula:

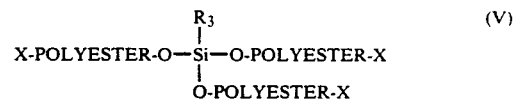

wherein $R_3$ and X have the meanings previously ascribed to them.

When all of the $R_1$, $R_2$ and $R_3$ groups are amenable to transesterification as described above, the branched polyester product obtained may be described by the schematic formula:

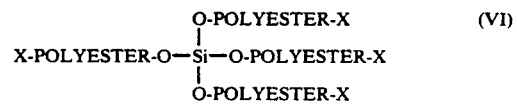

where X is as defined above.

The polyester resins of the invention described above may have a weight average molecular weight ($M_w$) of from about 2,000 to about 200,000, preferably from about 30,000 to about 150,000 and an intrinsic viscosity, as measured in a 50:40 by weight mixture of phenol: tetrachloroethane at 30° C., of at least about 0.3 dl/gm, to about 1.5 dl/gm.

Those skilled in the art will appreciate that during a given transesterification reaction between a hydroxyl-terminated polyester and a silane ester (II) as described above, the product resin will be a mixture of resin chains of the formulae (III), (IV) and (V) given above, together perhaps with unreacted polyester and silane (II) depending on the proportions of reactants, temperatures and reaction times permitted. If desired, the mixture of products may be separated by conventional methods based on the differences in molecular weights. However, the crude mixtures themselves are useful for many purposes, based on their weight average molecular weights and intrinsic viscosities.

The polyesters of the invention may be modified to obtain thermoplastic molding compositions by the addition of additives known to the art of plastics compounding. Such additives may include fillers (such as clay or talc), reinforcing agents (such as glass fibers), impact modifiers, other resins, plasticizers, flow promoters and other processing aids; stabilizers, colorants, mold release agents, flame retardants, ultraviolet screening agents, and the like.

The production of the molding compositions of the invention may be accomplished by blending the components using any of the blending means known for blending of thermoplastics, such as blending in a kneading machine (such as a Banbury mixer, Werner Pfleiderer blender, or in an extruder, or by means of a roll mill). The sequence of addition is not critical but the components should be thoroughly blended together.

The compounded molding compositions of the invention may be extruded and cut up, if so desired, into granules, pellets, and the like by known techniques. The further processing of the compounded molding compositions can be carried out by conventional molding or extrusion processes well known in the art.

The following examples and preparations describe the manner and process of making and using the invention and set forth the best mode contemplated by the inventor of carrying out the invention but are not to be construed as limiting the invention. Where reported, the following tests were carried out:

Intrinsic Viscosity

The intrinsic viscosity [n] may be measured at a temperature of 30° C. in a 60:40 by weight mixture of phenol: tetrachloroethane and is reported in deciliters/gram (dl/g). A rough measure of intrinsic viscosity may be appreciated from the torque required to move a polymer melt through a melt extruder.

EXAMPLES 1-4

A quantity of a hydroxyl-terminated polybutylene terephthalate (Valox ® 315, General Electric Co.) was added to the HBI system 90 Haake Buchler extruder, one minute after each run began (rotor speed of 150 rpm, temperature of 250° C.). Ten minutes after the polyester addition, various proportions of tetraphenoxysilane (TPS) were added. The TPS proportions and torque conditions resulting are all set forth in the TABLE, below.

Example 1 received no TPS addition and serves as a comparative example (control).

EXAMPLES 5-8

The general procedure of Examples 1-4, supra is repeated except that the Valox ® 315 as used therein is replaced with another hydroxyl-terminated polybutylene terephthalate (Valox ® 295, General Electric Co. supra). Example 5 is not an example of the invention but serves as a comparative example (control). The proportions of TPS and the torque conditions are set forth in the TABLE, below.

EXAMPLES 9-12

The general procedure of Examples 1-4, supra. is repeated except that the Valox ® 315 as used therein is replaced with hydroxyl-terminated polyethylene terephthalate (PET). The Example 9 is not an example of the invention but is a control provided for comparative purpose. The proportions of TPS added and the torque conditions are shown in the TABLE, below.

TABLE

| Example | Resin | TPS (gm) | Torque (Mg) (immediately before TPS addition) | Maximum torque (Mg) | Time (min) of maximum torque | % torque increase |
|---|---|---|---|---|---|---|
| 1 (control) | Valox ® 315 | 0.0 | 619 | 619 | 11 | 0 |
| 2 | Valox ® 315 | 0.25 | 615 | 1086 | 13 | 77 |
| 3 | Valox ® 315 | 0.50 | 611 | 1123 | 12 | 84 |
| 4 (control) | Valox ® 315 | 1.0 | 538 | 849 | 12 | 58 |
| 5 | Valox ® 295 | 0.0 | 197 | 197 | 11 | 0 |
| 6 | Valox ® 295 | 0.25 | 183 | 407 | 15 | 122 |
| 7 | Valox ® 295 | 0.50 | 214 | 783 | 14 | 266 |
| 8 | Valox ® 295 | 1.0 | 207 | 801 | 29 | 287 |
| 9 (control) | PET | 0.0 | 208 | 208 | 11 | 0 |
| 10 | PET | 0.25 | 207 | 409 | 15 | 98 |
| 11 | PET | 0.50 | 248 | 1184 | 15 | 377 |
| 12 | PET | 1.0 | 183 | 1828 | 14 | 900 |

What is claimed is:

1. A resin which comprises a polyester resin, endcapped with a monovalent moiety of the formula:

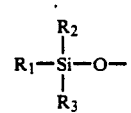

wherein $R_1$, $R_2$ and $R_3$ are each independently selected from the group consisting of hydrocarbyl, halogen-substituted hydrocarbyl and hydrocarbyloxy.

2. The resin of claim 1 wherein one of $R_1$, $R_2$ and $R_3$ is hydrocarbyloxy.

3. The resin of claim 1 wherein two of $R_1$, $R_2$ and $R_3$ are hydrocarbyloxy.

4. The resin of claim 1 wherein each of $R_1$, $R_2$ and $R_3$ are hydrocarbyloxy.

5. The resin of claim 1 wherein each of $R_1$, $R_2$ and $R_3$ is phenoxy.

6. The resin of claim 1 having the formula:

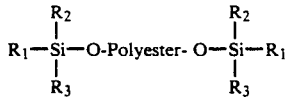

7. A chain extended polyester resin of the schematic formula:

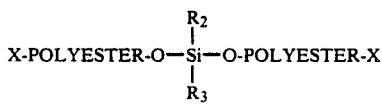

wherein
$R_2$ and $R_3$ are each independently selected from the group consisting of hydrocarbyl, halogen-substituted hydrocarbyl and hydrocarbyloxy;
X represents hydroxyl, a monovalent moiety of the formula:

$$R_1-\underset{\underset{R_3}{|}}{\overset{\overset{R_2}{|}}{Si}}-O- \quad (I)$$

wherein $R_2$ is as defined above and $R_1$ and $R_3$ each represent independently selected $R_2$, or one or more additional polyester segments joined through the moiety of formula (I) given above.

8. A branched polyester resin selected from those of the formulae:

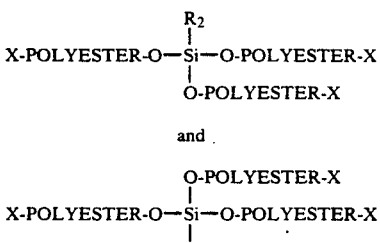

and

wherein $R_2$ represents a group selected from those consisting of hydrocarbyl, halogen-substituted hydrocarbyl and hydrocarbyloxy; X represents hydroxyl, a monovalent moiety of the formula:

$$R_1-\underset{\underset{R_3}{|}}{\overset{\overset{R_2}{|}}{Si}}-O- \quad (I)$$

wherein $R_2$ is as defined above and $R_1$ and $R_3$ each represent independently selected $R_2$, or one or more additional polyester segments joined through the moiety of formula (I) given above.

9. A thermoplastic resin composition which comprises the transesterification product of a hydroxyl-terminated polyester and a silane ester of the formula:

$$R_1-\underset{\underset{R_3}{|}}{\overset{\overset{R_2}{|}}{Si}}-O-R \quad (II)$$

wherein $R_1$, $R_2$ and $R_3$ are each independently selected from the group consisting of hydrocarbyl, halogen-substituted hydrocarbyl and hydrocarbyloxy; and R represents hydrocarbyl.

10. The product of claim 9 wherein R, $R_1$, $R_2$ and $R_3$ are each phenoxy.

* * * * *